UNITED STATES PATENT OFFICE.

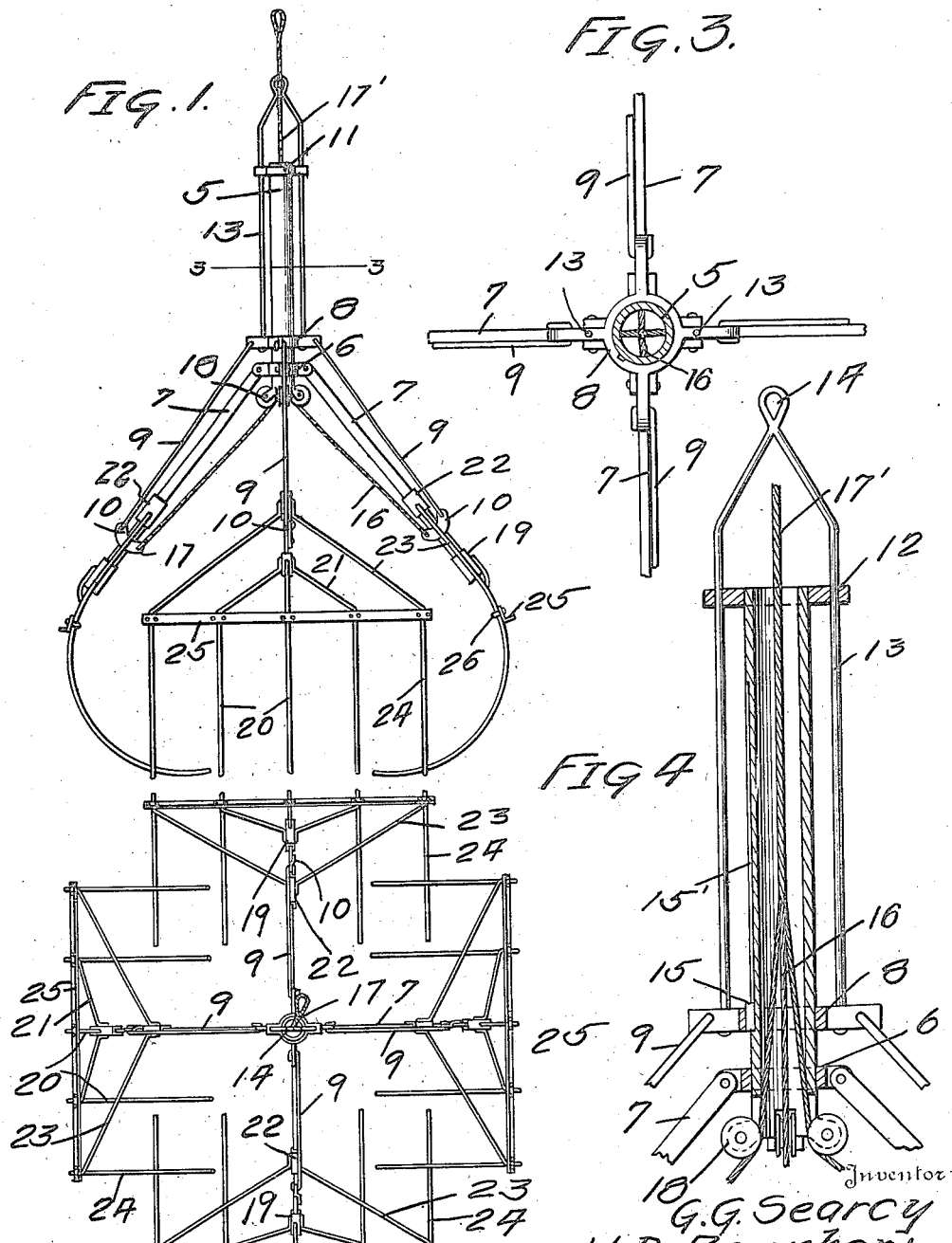

GEORGE G. SEARCY AND WILLIAM D. BARNHART, OF AMERICAN FALLS, IDAHO.

HAY-FORK MECHANISM.

1,167,785.  Specification of Letters Patent.  Patented Jan. 11, 1916.

Application filed May 28, 1915. Serial No. 31,048.

*To all whom it may concern:*

Be it known that we, GEORGE G. SEARCY and WILLIAM D. BARNHART, citizens of the United States, residing at American Falls, in the county of Power, State of Idaho, have invented certain new and useful Improvements in Hay-Fork Mechanism; and we do hereby declare the following to be a full, clear, and exact description of the invention, such as will enable others skilled in the art to which it appertains to make and use the same.

This invention relates to new and useful improvements in apparatus for handling hay or the like and is particularly directed to the provision of a fork mechanism which is so constructed as to grip the hay and then release it to dump the same.

It is the object of the present invention to provide a fork mechanism for the purpose described which may be suspended from a derrick or like structure, and which may readily be operated to release or grip the hay, it being more specifically the object to provide such a fork mechanism which may be operated either to gripping or releasing position through the medium of the suspension means therefor.

It is further the object to provide such a fork mechanism which comprises a relatively simple structure so that it will prove durable and efficient in use, and may be manufactured at a comparatively low cost.

With the above and other objects and advantages in view, the invention resides more particularly in the novel combination, formation and arrangement of parts as more fully described and pointed out in the appended claim.

Reference is had to the accompanying drawings wherein similar characters of reference designate corresponding parts throughout the several views, and in which:

Figure 1 is a side elevation of the improved fork mechanism. Fig. 2 is a top plan view thereof. Fig. 3 is a sectional view on the line 3—3 of Fig. 1, with the engaging portions of the tine members broken off, and Fig. 4 is a vertical sectional view taken through the head portion of the device.

Referring now more particularly to the accompanying drawings, there is provided a pipe section 5 which forms the head portion of the fork mechanism, and which has provided thereon adjacent its lower end a collar 6, recessed to pivotally secure the ends of tine bars 7. For actuating these members to and holding them in an extended or open position, wherein they lie in a substantially horizontal plane, a collar 8 is slidably disposed on the shaft section, and has pivoted thereto links 9 which in turn are pivoted to outstanding arms 10 formed at the outer ends of said bars. A collar 11 is provided at the upper end of the pipe section, and slidably passed through openings 12 in this bar are the arms of a yoke member 13 which is secured to the sliding collar 8, and which has formed at its bight portion, an eye 14 for securing a suspension rope thereto. The collar 8 is provided with a key 15 which slides in a longitudinal groove 15' in the pipe member to prevent turning of the collar. Thus when the device is extended from the yoke 14, the arms will be drawn to open position.

The means for actuating the tine bars to closing position to hold a load of hay comprises a plurality of cable members 16 which are secured to arms 17 on the inner faces of the tine bars, and which are spliced to a main cable 17' passed through the pipe section. The lower end of this pipe section carries a plurality of pulleys 18 over which the cable sections are trained. Thus when the mechanism is suspended from the cable 17, the tine bars are drawn together.

Each of the tine bars has bolted to its outer end a channel shaped section 19 carrying a plurality of spaced inwardly curved fingers 20, the outer of said fingers having their attaching ends directed laterally at 21 whereby they are secured to the portion 19. To provide additional fingers on each tine arm, a second channel shaped member 22 is provided and secured to the bar inwardly of the portion 19, and divergent arms 23 extend outwardly from this member and terminate in fingers 24 lying outwardly of and in substantially the plane of the fingers 20. To hold the fingers in alinement and to strengthen them, a bar 25 is provided and is secured to the upper portions of the fingers by U bolts 26. Thus a tine structure is provided wherein the strain incident to operation is distributed in such manner as to form an exceedingly efficient and durable structure.

From the foregoing it is seen that a device has been provided which will efficiently perform the functions set forth.

What is claimed is:

A fork mechanism comprising a tubular head portion, a plurality of tine members pivoted to one end portion of the head, a collar slidable on the head portion, links connecting the collar and the tine members, a suspension yoke secured to the collar and slidably held at the other end of the head, and a cable member slidable in the head and branches at its lower end secured to the tine members.

In testimony whereof, we affix our signatures, in the presence of two witnesses.

GEORGE G. SEARCY.
WILLIAM D. BARNHART.

Witnesses:
O. R. BAUM,
GRACE E. MCKINLEY.

Copies of this patent may be obtained for five cents each, by addressing the "Commissioner of Patents Washington, D. C."